United States Patent
Shaffer

[11] 3,722,309
[45] Mar. 27, 1973

[54] MULTIPLE GROOVE SHEAVE

[75] Inventor: S. Ralph Shaffer, Jeffersonville, Ind.

[73] Assignee: Arrowhead Engineering Corporation, Knox, Ind.

[22] Filed: May 28, 1971

[21] Appl. No.: 147,895

[52] U.S. Cl. .............................. 74/230.8, 29/159 R
[51] Int. Cl. ............................................ F16h 55/44
[58] Field of Search .......... 74/230.8; 29/159 R, 159.3

[56] References Cited

UNITED STATES PATENTS

| | | | |
|---|---|---|---|
| 2,646,689 | 7/1953 | Maher | 74/230.8 |
| 2,906,134 | 9/1959 | Bagley | 74/230.8 |
| 3,225,425 | 12/1965 | Skinner et al. | 29/159 R |

Primary Examiner—Charles J. Myhre
Assistant Examiner—Frank H. McKenzie, Jr.
Attorney—Hobbs & Green and Kemon, Palmer & Estabrook

[57] ABSTRACT

A multiple groove sheave in which a hub is formed with a plurality of axially spaced, radially extending, annular surfaces of different diameters, and a plurality of generally plate-like annular members with peripheral belt grooves therein secured to the annular surfaces in axially aligned relationship. The hub is preferably a sheet metal stamping and the grooved members are preferably formed by splitting the peripheral edge and parting the flanges formed by the split to provide the belt grooves. A method involving the steps of forming the hub and grooved members and securing the two parts together is also part of the broader concept of the disclosure.

7 Claims, 6 Drawing Figures

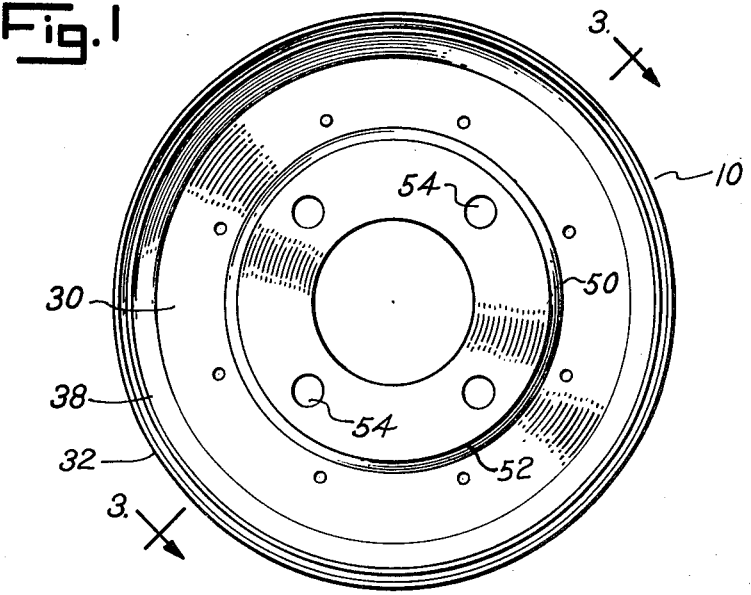
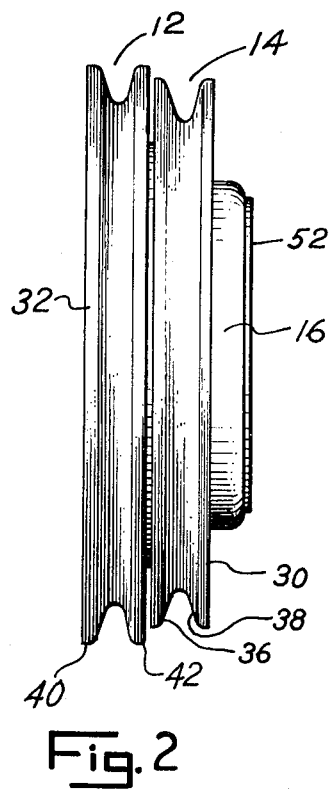
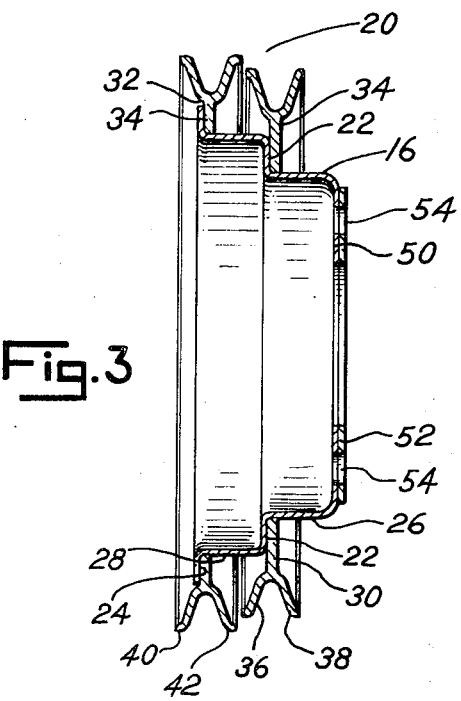

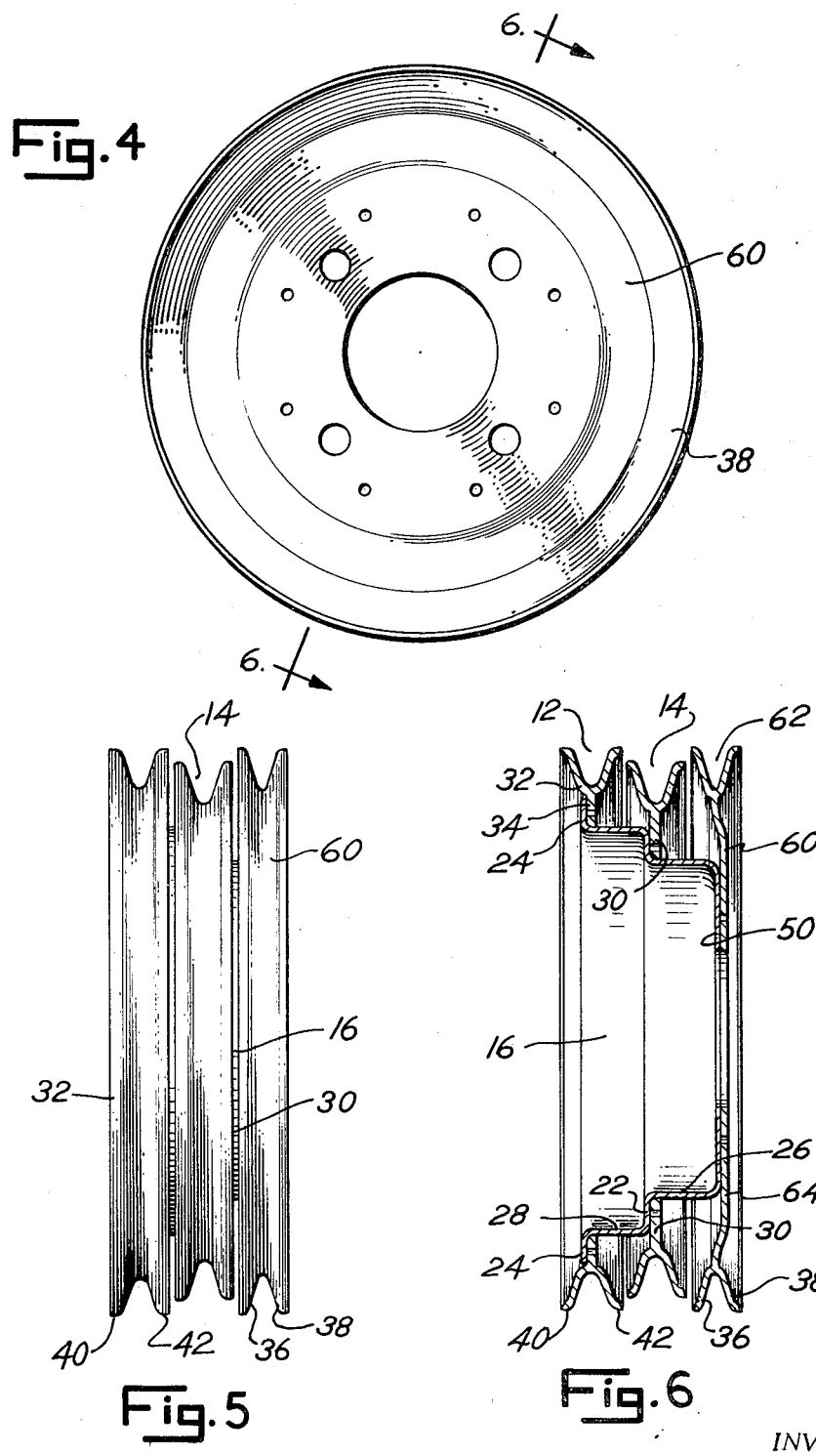

MULTIPLE GROOVE SHEAVE

A type of sheave or pulley which is particularly suitable for various applications requiring precision performance and rugged construction, consists of a disc-shaped body having its peripheral edge split and parted to form a belt groove, with the flanges formed integrally with the center portion and having one of a number of configurations best suited for the intended purpose. Commercial applications for this type of sheave have been primarily limited to single sheaves or a combination of single sheaves mounted separately on a shaft. While attempts have been made to form a multiple grooved sheave from a single blank by the splitting and parting operations, they have been generally unsuccessful or too costly to be commercially acceptable. It is therefore one of the principal objects of the present invention to provide a sheave having two or more belt grooves formed by a peripheral splitting and flange parting operation, which is precise and sturdy in construction and which can be formed using the production equipment for the single split sheave.

Another object of the invention is to provide a versatile, multiple groove sheave concept which can be readily embodied in sheaves of different sizes and of a different number of belt grooves, and which can be used to construct sheaves having grooves of different shapes and of different spacing from one groove to another.

Still another object of the invention is to provide a multiple groove pulley or sheave which can readily be constructed using several relatively simple fabricating steps and operations, and which requires a minimum amount of material for the particular size, rating and groove number, without sacrificing the strength and durability required for long and continued use under adverse operating conditions.

A further object is to provide a method of fabricating a multiple groove sheave, which includes the steps of splitting and parting the periphery of rotating discs to form the grooves, stamping a hub from sheet or plate material to provide a series of spaced radial surfaces, and mounting and securing in fixed position two or more split discs onto the radial surfaces of the fabricated hub structure.

Another object is to provide a sheave of the aforesaid type having a relatively simple hub which is easily fabricated by a stamping operation, and which has an annular radial land for each of the split discs forming the grooves of the sheave.

Additional objects and advantages of the present invention will become apparent from the following description and accompanying drawings, wherein:

FIG. 1 is a side elevational view of a multiple groove sheave embodying the present invention;

FIG. 2 is an edge elevational view of the sheave shown in FIG. 1;

FIG. 3 is a transverse cross sectional view of the sheave shown in FIG. 2, the section being taken on a line intersecting the axis of the pulley;

FIG. 4 is a side elevational view of another multiple groove sheave embodying the present invention;

FIG. 5 is an edge elevational view of the sheave shown in FIG. 4; and

FIG. 6 is a transverse cross sectional view of the sheave shown in FIG. 4, the section being taken on a line intersecting the axis of the pulley.

Referring more specifically to the drawings, and to the embodiment of the invention illustrated in FIGS. 1, 2 and 3, numeral 10 indicates generally the sheave, the one shown in this embodiment having two belt grooves 12 and 14. The type of groove 12 or 14 is primarily intended for V-belts; however, other groove shapes and other types of belts may be used to satisfy operational requirements.

The sheave of the present invention consists of a hub 16 or shell, having a series of step-like lands and a plurality of annular members 20 having an enlarged center opening for seating or the lands of the hub. The hub shown in FIGS. 1 through 3 has radially extending surfaces or lands 22 and 24, and axially aligned connection portions 26 and 28 of a generally cylindrical configuration. In this embodiment, there are two annular members 30 and 32, each having an annular plate-like part 34 and two outwardly extending flanges 36 and 38 joined integrally to the annular part 34 and defining grooves 12 and 14. The outer edges of the flanges preferably include rims 40 and 42 which provide a smooth peripheral edge for contact with the sides of the sheave belt. The two sheave members are preferably produced by the method disclosed and claimed in U.S. Pat. No. 3,225,425 and on a machine disclosed and claimed in U.S. Pat. No. 3,370,447. The method and machine involve the steps of rotating the annular member, slitting the peripheral edge thereof, and parting the portions on each side of the slit to form flanges 36 and 38. The two flanges are usually reformed during the slitting operation to provide the desired groove configuration and to form rims 40 and 42.

The hub normally is provided with an internally extending flange 50 and may contain a reinforcing plate 52 through which a plurality of equally spaced holes 54 extend for mounting the sheave on the end of a crank shaft of an automotive vehicle engine or other type of drive shaft. The type and shape of internal flange 50 and plate 52 and the holes therein are determined by the mounting plate or fixture on the crank or other drive shaft. Plate 52 is seated firmly against the side of inwardly extending flange 50 and is preferably secured thereto by resistance welding.

The plate-like annular parts 34 of grooved members 30 and 32 are seated on radially extending flanges 22 and 24, respectively, and are secured thereto preferably by resistance welding; however, rivets or other types of securing means may be used if desired. While the two portions 22 and 24 shown, with the possible exception of several holes, are continuous radial flanges, they may be equally spaced, radial protrusions, forming an annular arrangement on which annular members 30 and 32 are seated and secured.

In fabricating the pulley embodying the present invention, the hub is stamped or deep drawn, trimmed and punched, using standard practices. The annular grooved members are formed in the manner previously mentioned herein, in which slitting, parting and reforming tools are used to form the flanges on a rotating disc-like member. While the annular members are preferably formed by the slitting and parting method, other types of annular groove members may be used, such as those formed with two separate pre-formed plates secured to one another to form the flanges. The materials used in the hub and in the annular members may be different metals; for example, the hub may be formed of steel and the annular members either steel or aluminum.

The embodiment illustrated in FIGS. 4, 5 and 6 is essentially the same as the embodiment in the preceding figures, and hence like numerals will be given to like parts with respect to the details thereof. In the embodiment of FIG. 4, the hub is identical in structure to the structure of the hub shown in the preceding figures. In this embodiment three annular grooved members are used to form a triple pulley structure. Different diameter annular members, and hence different diameter or pitch of the sheave are obtained by selecting a desired combination from one annular member to another, as seen in the drawing. The two outside members are substantially the same in diameter, whereas the center annular member is smaller. The shape of the belt groove may also vary from one annular member to another. In the embodiment of FIG. 4, a third annular member 60 is secured to the inwardly extending flange 50 and is used in place of reinforcing member 52 to give added strength to the inwardly extending flange. The annular member contains a belt groove 62 defined by the same type of flanges 36 and 38 and rims 40 and 42. The inner flat annular part 64 extends inwardly to substantially the inner edge of annular flange 50. While, in the two embodiments of the drawings, two and three grooved sheaves are illustrated, the hub may be formed with additional radial lands or surfaces, and additional annular grooved members may be mounted on the hub lands to form a sheave having a larger number of grooves. In any of the embodiments of the present invention, the annular grooved members may be of the same diameter or pitch and of the same shape, or they may be of different diameters and shapes.

While only two embodiments of the present multiple sheave have been shown and described herein, various additional changes and modifications may be made without departing from the scope of the invention.

I claim:

1. A multiple groove sheave comprising a hub having a plurality of radially extending surfaces of a generally annular configuration spaced axially from one another and being progressively larger in diameter from one hub end to the other, at least one of said radial surfaces being spaced inwardly from both ends of the hub, and a plurality of annular members having belt grooves in the periphery thereof seating on and being rigidly secured to said radially extending surfaces.

2. A multiple groove sheave as defined in claim 1 in which said hub is formed of sheet metal.

3. A multiple groove sheave as defined in claim 1 in which each of said annular members has a plate-like annular inner part and two angularly outwardly extending flanges formed integrally with said inner part.

4. A multiple groove sheave as defined in claim 1 in which said radially extending surfaces are substantially continuous throughout the circumference of the hub.

5. A multiple groove sheave as defined in claim 1 in which annular cylindrical portions are disposed between said radially extending surfaces and are joined integrally therewith to form a unitary hub structure.

6. A multiple groove sheave as defined in claim 1 in which said annular members are welded to said radially extending surfaces.

7. A multiple groove sheave as defined in claim 1 in which the diameters of the grooves are different from one annular member to another.

* * * * *